United States Patent
Okada et al.

(10) Patent No.: US 12,275,373 B2
(45) Date of Patent: Apr. 15, 2025

(54) VEHICLE CONTROL SYSTEM

(71) Applicant: TOYOTA JIDOSHA KABUSHIKI KAISHA, Toyota (JP)

(72) Inventors: Hiroki Okada, Toyota (JP); Ryuta Atsumi, Toyota (JP); Satoshi Fujisaki, Nagoya (JP); Daisuke Hiroki, Toda (JP); Shinpei Asai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 17/679,577

(22) Filed: Feb. 24, 2022

(65) Prior Publication Data

US 2022/0176910 A1  Jun. 9, 2022

Related U.S. Application Data

(63) Continuation of application No. 16/929,844, filed on Jul. 15, 2020, now Pat. No. 11,292,432, which is a
(Continued)

(30) Foreign Application Priority Data

Sep. 27, 2017  (JP) ................................. 2017-186794

(51) Int. Cl.
*B60R 25/24*  (2013.01)
*B60R 25/01*  (2013.01)
(Continued)

(52) U.S. Cl.
CPC ............ *B60R 25/241* (2013.01); *B60R 25/01* (2013.01); *B60R 25/245* (2013.01);
(Continued)

(58) Field of Classification Search
CPC ..... B60R 25/241; B60R 25/01; B60R 25/245; B60R 25/25; B60R 25/31; G07C 9/00309; G07C 9/00563; G07C 2009/00555
See application file for complete search history.

(56) References Cited

U.S. PATENT DOCUMENTS 5,787,187 A * 7/1998 Bouchard ................ A61B 5/12
235/382
5,811,897 A  9/1998 Spaude et al.
(Continued)

FOREIGN PATENT DOCUMENTS

EP  1465117 A1  10/2004
EP  1715462 A1  10/2006
(Continued)

OTHER PUBLICATIONS

Partial English Translation of Jun. 28, 2022 Office Action issued in Japanese Patent Application No. 2021-116309.
(Continued)

*Primary Examiner* — Thomas D Alunkal
(74) *Attorney, Agent, or Firm* — Oliff PLC

(57) ABSTRACT

A vehicle control system includes a terminal device and a vehicle. The terminal device includes a first verification unit that verifies whether the terminal devices matches the vehicle through wireless communication when the terminal device enters an area in which wireless communication between the terminal device and the vehicle is available, and an operation instruction unit that receives an instruction to execute a predetermined operation of the vehicle from the user and the first verification unit has verified that the terminal device matches the vehicle, and transmits a signal according to the instruction to the vehicle, and the vehicle includes a second verification unit that communicates with the first identification unit and verify whether with the
(Continued)

vehicle matches the terminal device, and an operation controller that receives the signal from the operation instruction unit and executes the predetermined operation according to the signal.

14 Claims, 7 Drawing Sheets

Related U.S. Application Data continuation of application No. 16/117,601, filed on Aug. 30, 2018, now Pat. No. 10,752,210.

(51) Int. Cl.
    *G07C 9/00* (2020.01)
    *B60R 25/25* (2013.01)
    *B60R 25/31* (2013.01)

(52) U.S. Cl.
    CPC ..... *G07C 9/00309* (2013.01); *G07C 9/00563* (2013.01); *B60R 25/25* (2013.01); *B60R 25/31* (2013.01); *G07C 2009/00555* (2013.01); *G07C 2009/00809* (2013.01)

(56) References Cited

U.S. PATENT DOCUMENTS

| | | | |
|---|---|---|---|
| 6,041,410 | A | 3/2000 | Hsu et al. |
| 6,140,939 | A | 10/2000 | Flick |
| 7,158,006 | B2 | 1/2007 | Lee et al. |
| 10,752,210 | B2 * | 8/2020 | Okada ............... G07C 9/00309 |
| 2003/0163710 | A1 | 8/2003 | Ortiz et al. |
| 2004/0252013 | A1 | 12/2004 | Fuks et al. |
| 2007/0115096 | A1 * | 5/2007 | Suzuki ............... B60R 25/2036 340/5.72 |
| 2008/0079537 | A1 | 4/2008 | Touge |
| 2008/0146890 | A1 | 6/2008 | LeBoeuf et al. |
| 2008/0158096 | A1 | 7/2008 | Breed |
| 2009/0087003 | A1 | 4/2009 | Zurek et al. |
| 2009/0219134 | A1 | 9/2009 | Nakasato et al. |
| 2015/0145648 | A1 | 5/2015 | Winkelman |
| 2015/0264048 | A1 | 9/2015 | Shirai et al. |
| 2016/0107611 | A1 | 4/2016 | Siswick et al. |
| 2017/0151956 | A1 * | 6/2017 | Boesen ............... B60N 2/0248 |
| 2017/0308689 | A1 * | 10/2017 | Boesen ............... G06F 1/163 |
| 2018/0272991 | A1 | 9/2018 | Tayama |
| 2019/0092281 | A1 | 3/2019 | Okada et al. |

FOREIGN PATENT DOCUMENTS

| | | |
|---|---|---|
| EP | 2096008 A1 | 9/2009 |
| JP | 2002-165778 A | 6/2002 |
| JP | 2010-086328 A | 4/2010 |
| JP | 2011-032782 A | 2/2011 |
| JP | 2013-063672 A | 4/2013 |
| JP | 5406271 B2 | 2/2014 |
| JP | 2015-35697 A | 2/2015 |
| JP | 2015-169008 A | 9/2015 |
| JP | 2015-176317 A | 10/2015 |
| JP | 2017-043267 A | 3/2017 |
| JP | 2019-60175 A | 4/2019 |

OTHER PUBLICATIONS

"NEC Develops Biometrics Technology That Uses Sound To Distinguish Individually Unique Ear Cavity Shape". Press Releases, NEC, Mar. 11, 2016, URL: <https://www.nec.com/en/press/201603/global_20160307_01.html>.
Yuxi Liu et al. "Biometric Identification Based on Transient Evoked Otoacoustic Emission". IEEE International Symposium on Signal Processing and Information Technology, IEEE, Dec. 12, 2013, pp. 267-271.
Sep. 6, 2019 Office Action issued in U.S. Appl. No. 16/117,601.
Jan. 10, 2020 Office Action issued in U.S. Appl. No. 16/117,601.
Haataja, K. et al., "Overview of Bluetooth Security", Chapter 2 in Bluetooth Security Attacks, SpringerBriefs in Computer Science, 3, 2013, 12 pages. (Year: 2013).
Apr. 15, 2020 U.S. Notice of Allowance issued U.S. Appl. No. 16/117,601.
Jun. 10, 2021 Office Action issued in U.S. Appl. No. 16/929,844.
Dec. 1, 2021 Notice of Allowance issued in U.S. Appl. No. 16/929,844.
Jan. 16, 2025 Non-Final Rejection received in U.S. Appl. No. 18/748,993.

* cited by examiner

FIG. 1
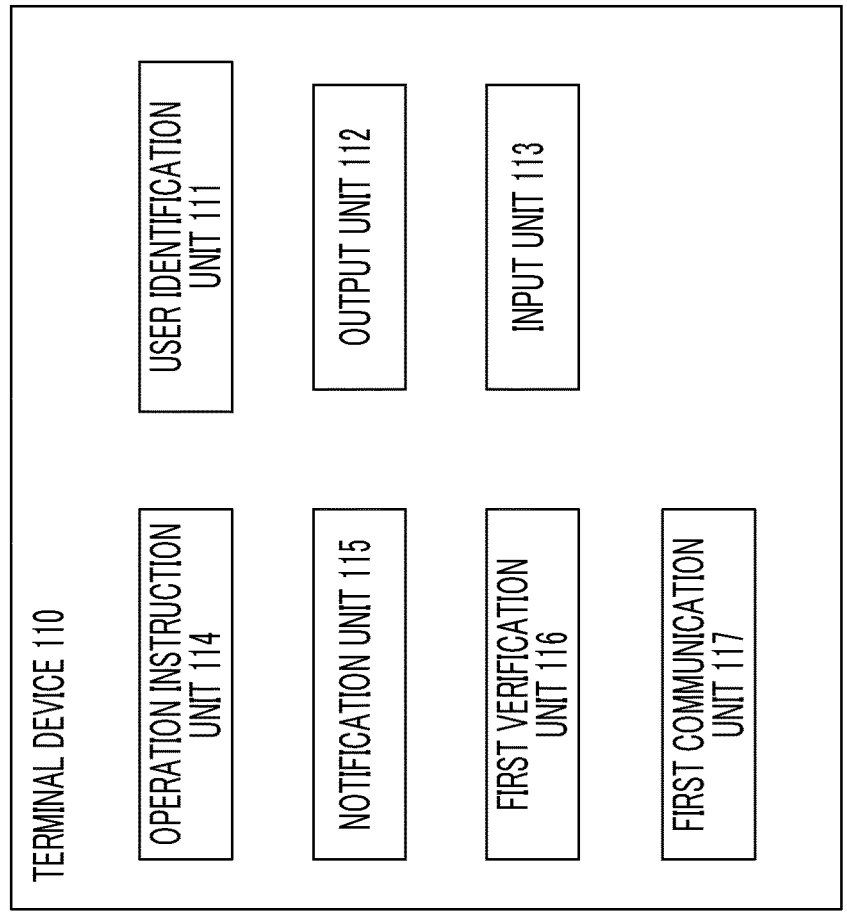
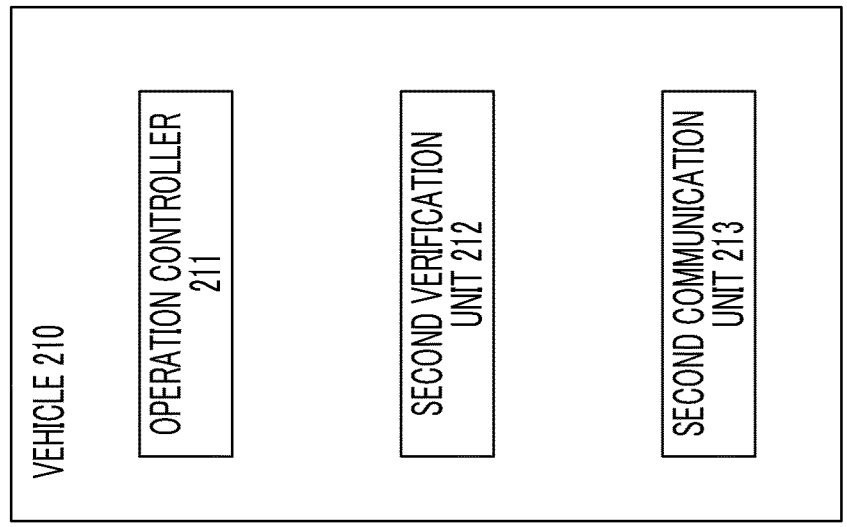

FIG. 4
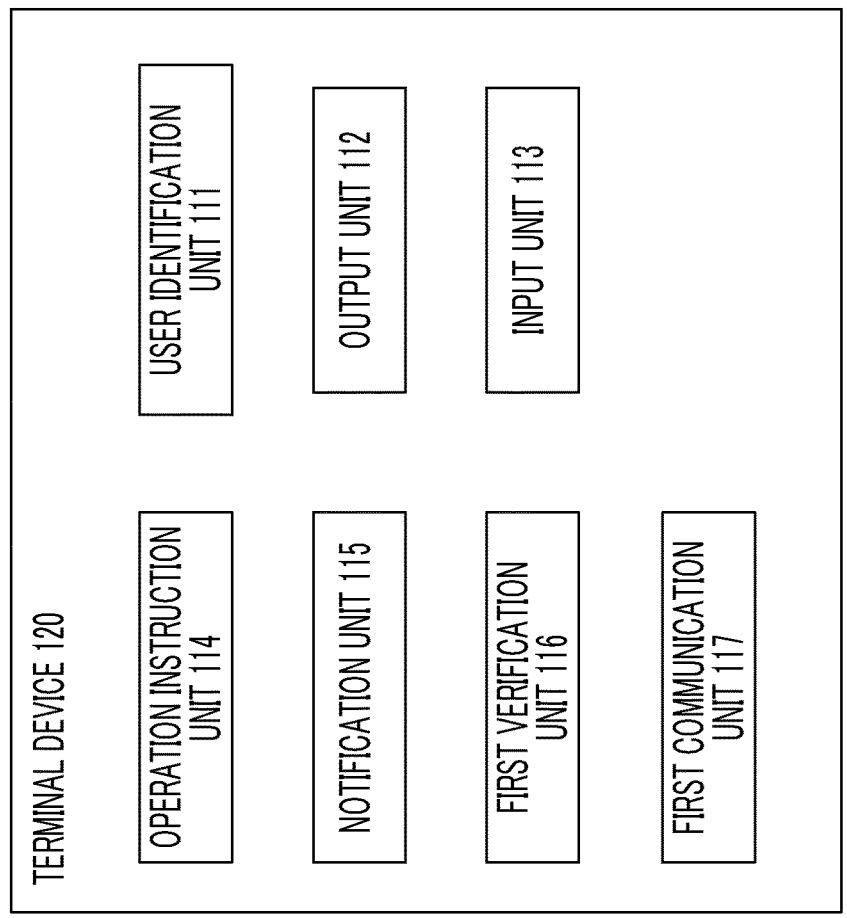
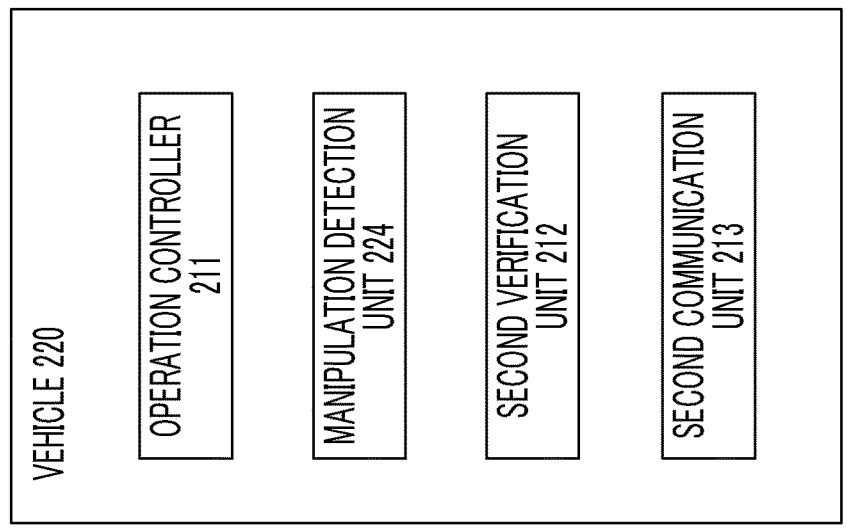

FIG. 6
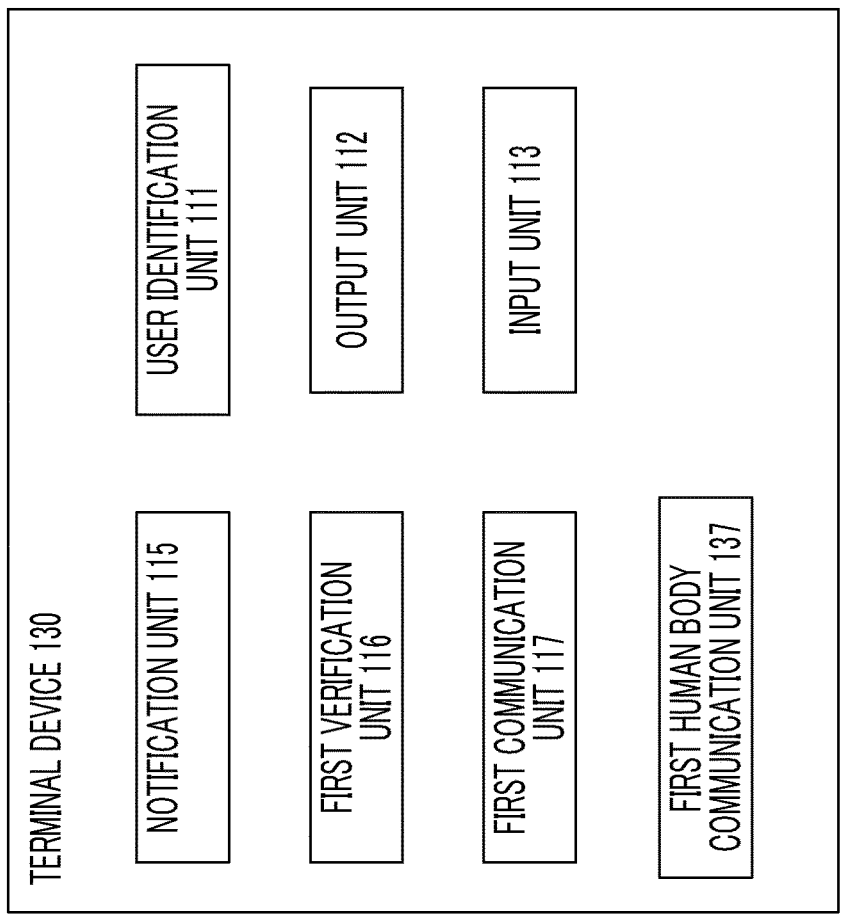
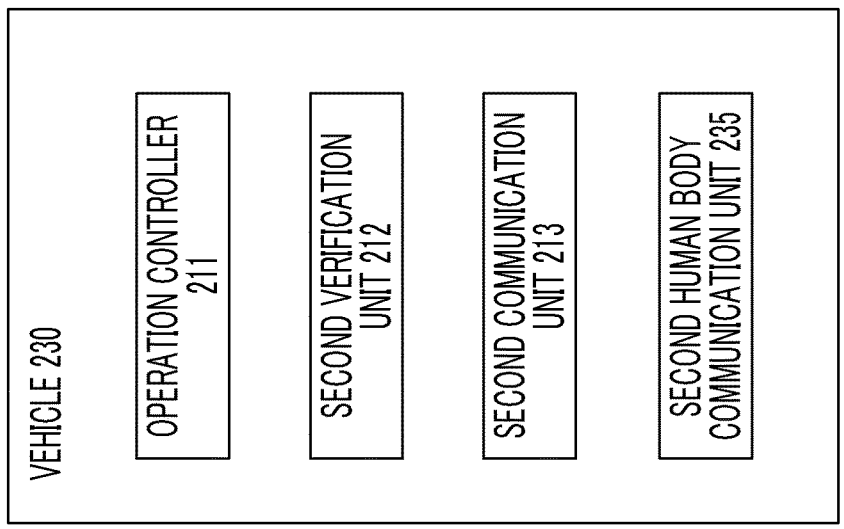

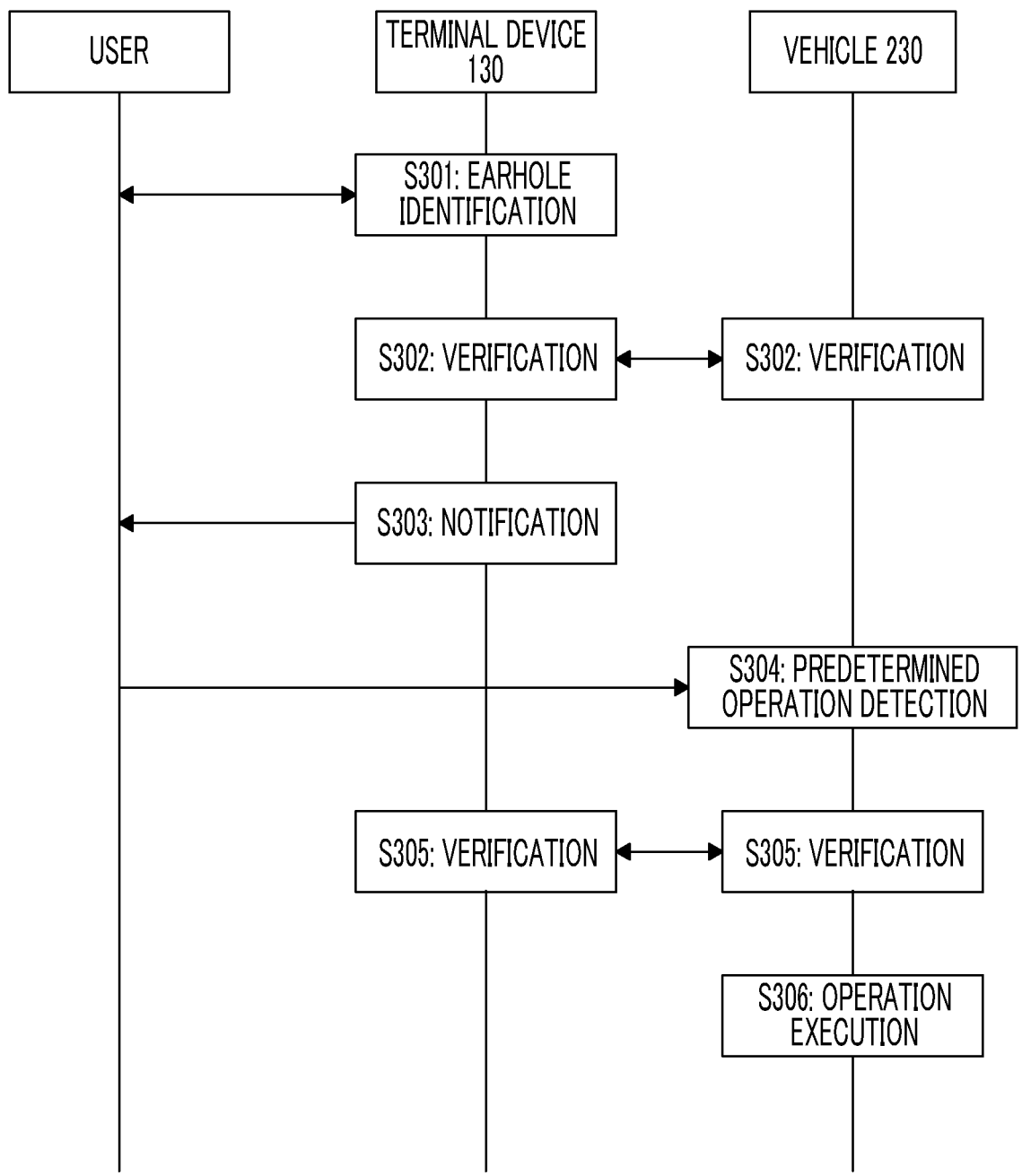

VEHICLE CONTROL SYSTEM

INCORPORATION BY REFERENCE

This is a Continuation of Application Ser. No. 16/929,844 filed Jul. 15, 2020, which in turn is a Continuation of Application Ser. No. 16/117,601 filed Aug. 30, 2018, which claims the benefit of Japanese Priority Application No. 2017-186794 filed Sep. 27, 2017. The disclosure of each of the prior applications is hereby incorporated by reference herein in its entirety.

BACKGROUND

1. Technical Field

The present disclosure relates to a vehicle control system that causes a vehicle to perform a predetermined operation.

2. Description of Related Art

A smart system in which a user carrying an electronic key or the like verified to match a vehicle through wireless communication, performs a predetermined manipulation such as a touch on a door handle such that an operation of door unlocking or the like can be controlled has been proposed (see Japanese Unexamined Patent Application Publication No. 2015-169008 (JP 2015-169008 A)).

Meanwhile, a terminal device called a hearable device, having an earhole (external ear canal) verification function, which is mounted on an ear of a user, emits a reference sound from sound emission means to an ear canal, receives a reflected sound of the reference sound using sound collection means, and identifies the user using characteristics of the reflected sound has been proposed (see Japanese Unexamined Patent Application Laid-Open No. 2010-86328).

SUMMARY

When a hearable device becomes widespread, performance of an verification process with both a user and a vehicle using the healable device instead of an electronic key of a smart system is conceivable. However, when a general communication standard in which an area in which communication with the vehicle is possible is wider than in the related art and is about 10 meters from a vehicle is used, there is a likelihood of an unlocking manipulation or the like being performed by a third party near the vehicle in comparison with the user after successful verification.

The present disclosure provides a vehicle control system in which a likelihood of an operation of a vehicle being executed by a third party is further reduced.

A first aspect of the present disclosure relates to a vehicle control system. The vehicle control system includes a terminal device including an ear mounting unit to be mounted on an ear of a user, and a vehicle that performs wireless communication with the terminal device. The terminal device includes a user identification unit configured to identify the user based on an acoustic reflected sound in an earhole, a first verification unit configured to verify whether the terminal device matches the vehicle through wireless communication when the terminal device enters an area in which wireless communication between the terminal device and the vehicle is available, and an operation instruction unit configured to receive an instruction to execute a predetermined operation of the vehicle from the user after the user identification unit has identified the user and the first verification unit has verified that the terminal device matches the vehicle, and transmit a signal according to the instruction to the vehicle. The vehicle includes a second verification unit configured to communicate with the first verification unit and verify whether the vehicle matches the terminal device, and an operation controller configured to receive the signal from the operation instruction unit and execute the predetermined operation according to the signal.

According to the first aspect of the present disclosure, since the user can cause the vehicle to execute the operation by performing utterance to the terminal device mounted on the user, it is possible to further reduce a likelihood that a third party near the vehicle causing the vehicle to execute the operation.

A second aspect of the present disclosure relates to a vehicle control system. The vehicle control system includes a terminal device including an ear mounting unit to be mounted on an ear of a user, and a vehicle that performs wireless communication with the terminal device. The terminal device includes a user identification unit configured to identify the user based on an acoustic reflected sound in an earhole: a first verification unit configured to verify whether the terminal device matches the vehicle through wireless communication when the terminal device enters an area in which wireless communication between the terminal device and the vehicle is available, and an operation instruction unit configured to transmit a signal according to an instruction to prohibit the operation of the vehicle according to a predetermined manipulation to the vehicle when the instruction is received from the user within a predetermined period from reception of a detection signal indicating that a detection is made that a predetermined manipulation is performed with respect to the vehicle when the signal is received from the vehicle after the user identification unit has identified the user and the first verification unit has verified that the terminal device matches the vehicle. The vehicle includes a second verification unit configured to communicate with the first verification unit and verify whether the vehicle matches the terminal device, a manipulation detection unit configured to detect the predetermined manipulation and notify the operation instruction unit of the predetermined manipulation when the second verification unit verifies that the vehicle matches the terminal device, and an operation controller configured to execute the operation of the vehicle corresponding to the predetermined manipulation when the signal according to the instruction is not received from the operation instruction unit within the predetermined period after the manipulation detection unit detects the predetermined manipulation, and the operation controller being configured not to execute the operation of the vehicle when the signal according to the instruction is received from the operation instruction unit within the predetermined period after the manipulation detection unit detects the predetermined manipulation.

According to the second aspect of the present disclosure, even when a predetermined manipulation is performed by a third party, the user can cancel the operation of the vehicle according to the manipulation of the third party. Accordingly, it is possible to further reduce a likelihood that a third party near the vehicle causing the vehicle to execute the operation.

A third aspect of the present disclosure relates to a vehicle control system. The vehicle control system includes a terminal device including an ear mounting unit to be mounted on an ear of a user, and a vehicle that performs communication with the terminal device. The terminal device includes a user identification unit configured to identify the user based on an acoustic reflected sound in an earhole: a first verification unit configured to verify whether the terminal device matches the vehicle through wireless communication when the terminal device enters an area in which wireless communication between the terminal device and the vehicle is available, and a first human body communication unit provided to include an electrode that comes into contact with the user when the ear mounting unit is mounted on the ear of the user, and configured to verify whether the terminal device matches the vehicle through communication via a body of the user when the user comes into contact with the vehicle and performs a predetermined manipulation after the user identification unit has identified the user and the first verification unit has verified that the terminal device matches the vehicle. The vehicle includes a second identification unit configured to communicate with the first identification unit and verify whether the vehicle matches the terminal device, a second human body communication unit provided to include an electrode that comes into contact when the user performs the predetermined manipulation, and configured to detect the predetermined manipulation, and the second human body communication unit verifying whether the vehicle matches the terminal device through communication via a body of the user with the first human body communication unit, and an operation controller configured to execute the operation of the vehicle corresponding to the predetermined manipulation when the second human body communication unit verifies that the vehicle matches the terminal device.

According to the third aspect of the present disclosure, since the verification between the vehicle and the terminal device is performed through human body communication according to a predetermined manipulation of a user having the terminal device mounted thereon, it is possible to further reduce a likelihood that a third party near the vehicle causing the vehicle to execute the operation.

In the vehicle control system according to the first to third aspects of the present disclosure, the terminal device may further include a notification unit configured to perform a notification to the user when the user identification unit identifies the user and the first verification unit verifies that the terminal device matches the vehicle.

According to the first to third aspects of the present disclosure, the user can recognize that the user is within a predetermined distance from the vehicle.

In the vehicle control system according to the second aspect of the present disclosure, the terminal device may further include a notification unit configured to perform a notification to the user according to a detection signal indicating that a detection is made that the predetermined manipulation is performed with respect to the vehicle.

According to the second aspect of the present disclosure, when a third party performs a predetermined manipulation, the user can more reliably recognize the manipulation of the third party.

In the vehicle control system according to the first to third aspects of the present disclosure, the notification unit of the terminal device may perform the notification through vibration.

According to the first to third aspects of the present disclosure, it is possible to further reduce a likelihood of the user feeling annoying in comparison with a notification through voice or the like.

In the vehicle control system according to the first to third aspects of the present disclosure, the predetermined operation may include at least one of locking or unlocking of a door, startup of an engine, opening of a trunk, and opening of a fuel filler port.

According to the first to third aspects of the present disclosure, it is possible to further control various operations and to further improve convenience.

According to the aspects of the present disclosure, since the vehicle operation is controlled by performing an operation instruction or an operation prohibition instruction with respect to a terminal device mounted on a user or human body communication via the user having the terminal device mounted thereon, it is possible to provide a vehicle control system in which a likelihood of the operation of the vehicle being executed by a third party is further reduced.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a functional block diagram of a vehicle control device according to a first embodiment;

FIG. 4 is a functional block diagram of the vehicle control device according to the second embodiment;

FIG. 6 is a functional block diagram of the vehicle control device according to the third embodiment; and FIG. 7 is a sequence diagram illustrating a process of the vehicle control device according to the third embodiment.

DETAILED DESCRIPTION OF EMBODIMENTS

Overview

Figure 2:
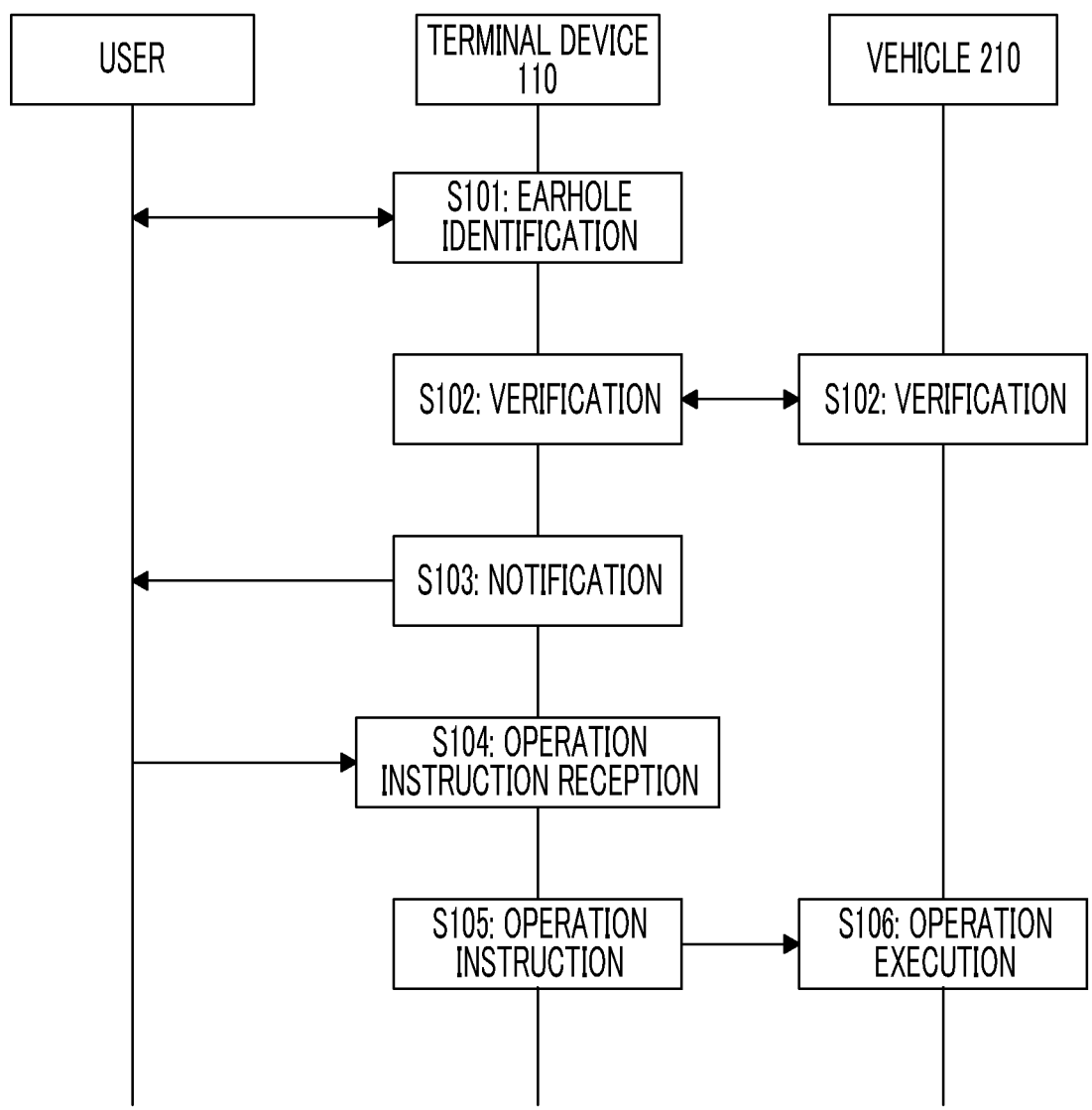
FIG. 2 is a sequence diagram illustrating a process of the vehicle control device according to the first embodiment.

A vehicle control system performs an instruction or cancelation of a vehicle operation based on an operation instruction or an operation prohibition instruction with respect to a terminal device mounted on a user. Alternatively, the vehicle control system performs human body communication via the user having the terminal device mounted thereon to control the vehicle operation. Therefore, it is possible to further reduce a likelihood of the operation of the vehicle being executed by a third party.

Hereinafter, each embodiment will be described in detail with reference to the drawings.

First Embodiment

Configuration

FIG. 1 illustrates a functional block diagram of a vehicle control system 11 according to the first embodiment. The vehicle control system 11 includes a terminal device 110 and a vehicle 210.

The terminal device 110 is a small device including an ear mounting unit that is a mounted on an ear of a user. The terminal device 110 includes a user identification unit 111, an output unit 112, an input unit 113, an operation instruction unit 114, a notification unit 115, a first verification unit 116, and a first communication unit 117. The output unit 112 includes a speaker capable of emitting sound to an external ear canal (hereinafter referred to as an earhole) of the user. The input unit 113 includes an identification microphone that collects acoustic reflected sound in the earhole of the user, and an utterance microphone that collects uttered sound of the user. The input unit 113 has a function of recognizing voice from the collected uttered sound of the user. The vehicle 210 includes an operation controller 211, a second verification unit 212, and a second communication unit 213. Each of the terminal device 110 and the vehicle 210 may have a controller that appropriately controls an operation of each of the above-described units. The notification unit 115 generates content of notification for the user as voice or the like, and causes the output unit 112 to output the notification.

Process

FIG. 2 is a sequence diagram illustrating a process of the vehicle 210 and the terminal device 110. This process will be described with reference to FIG. 2.

Step S101: The terminal device 110 performs earhole identification. The earhole identification may be performed when the terminal device 110 is mounted on the ear and may be then performed periodically or may be performed before any operation each time the terminal device 110 performs the operation. The user identification unit 111 of the terminal device 110 emits an identification sound from the output unit 112 to the ear canal, acoustic reflected sound of the identification sound is acquired by the identification microphone of the input unit 113, and characteristics of the acoustic reflected sound are compared with characteristics of an acoustic reflected sound of the user registered in advance to identify user. In the case of identification failure, the subsequent processes are not performed and this sequence is ended. The identification sound may be a sound in an audible band or may be a sound in an inaudible band such as ultrasonic waves. In the case of the sound in the audible band, the user can recognize that the identification process is performed through the sound. In the case of the sound in the inaudible band, a notification may be sent to the user by voice such as "the identification is performed" before the identification process.

Figure 3:
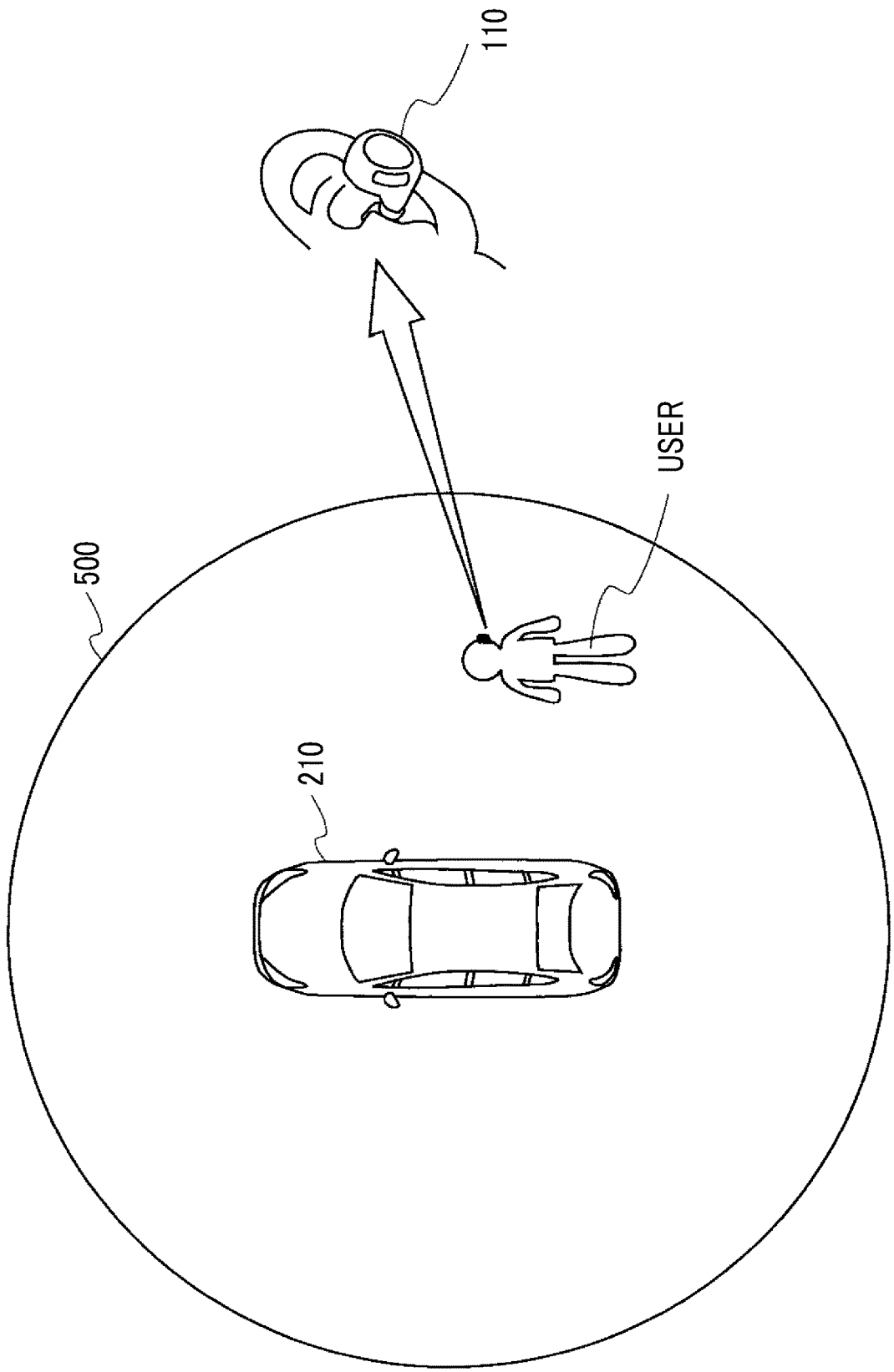
FIG. 3 is a diagram illustrating an example of a communicable range according to the first to third embodiments.

Step S102: When the terminal device 110 enters a range in which communication with the vehicle 210 is possible, the first communication unit 117 of the terminal device 110 performs wireless communication with the second communication unit 213 of the vehicle 210, for example, upon reception of a radio signal periodically transmitted by the vehicle 210. FIG. 3 illustrates an example of a range 500 in which the vehicle 210 and the terminal device 110 can wirelessly communicate with each other. The range 500 is, for example, in a range of about 10 m or less from the vehicle. The wireless communication may be controlled by the first verification unit 116 of the terminal device 110 and the second verification unit 212 of the vehicle 210, and collation may be performed as to an identifier of the terminal device 110 matches a regular identifier registered in the vehicle 210 in advance through communication to perform verification. Alternatively, collation may be performed as to an identifier of the vehicle 210 matches a regular identifier registered in the terminal device 110 in advance to perform verification. In the case of verification failure, subsequent processes are not performed and this sequence is ended.

Step S103: When the verification in step S102 is successful, the notification unit 115 of the terminal device 110 drives the output unit 112 to perform a notification to the user. Accordingly, the user can recognize that the terminal device 110 has entered the range in which communication with the vehicle 210 is possible. A method of the notification is not limited. The notification may be performed by a voice that is output from the speaker of the output unit 112, or the output unit 112 may include a vibrator and perform the notification through vibration. Voice is easier to understand, but the voice is annoying when the voice is frequent, and therefore, a degree of vibration felt by the user may be used. Either the voice or the vibration may be selected by the user.

Step S104: When the user receives the notification, the user issues an instruction to execute a predetermined operation of the vehicle 210. The instruction can be made, for example, by uttering predetermined words such as "unlock a door" or "open a door". The voice is input to the utterance microphone of the input unit 113 of the terminal device 110. The operation instruction unit 114 of the terminal device 110 receives the input predetermined words as an operation instruction for the vehicle. Here, the same earhole identification as in step S101 may be performed and identification of the uttering user may be performed.

Step S105: The operation instruction unit 114 of the terminal device 110 transmits a signal indicating the received operation instruction to the vehicle 210 via the first communication unit 117.

Step S106: The operation controller 211 of the vehicle 210 receives the signal indicating the operation instruction from the operation instruction unit 114 of the terminal device 110 via the second communication unit 213 and executes an operation such as door unlocking according to the signal. The sequence is then ended.

Effects

According to the above process, the user can recognize that the terminal device 110 enters the range in which communication with the vehicle 210 is possible and that the operation of the vehicle according to this embodiment can be executed. Thereafter, the user can cause the vehicle to execute the operation by performing utterance to the mounted terminal device 110. Accordingly, even when a communicable area is wider than in the related art, it is possible to further reduce a likelihood that a third party near the vehicle causing the vehicle to execute the operation.

Second Embodiment

Configuration

FIG. 4 is a functional block diagram of a vehicle control system 12 according to a second embodiment. The vehicle control system 12 includes a terminal device 120 and a vehicle 220. The terminal device 120 has the same functional block configuration as the terminal device 110 in the first embodiment. The vehicle 220 further includes a manipulation detection unit 224 in the vehicle 210 according to the first embodiment. Hereinafter, differences between the second embodiment and the first embodiment will be mainly described, and description of the same or corresponding features will be omitted or simplified.

Process

Figure 5:
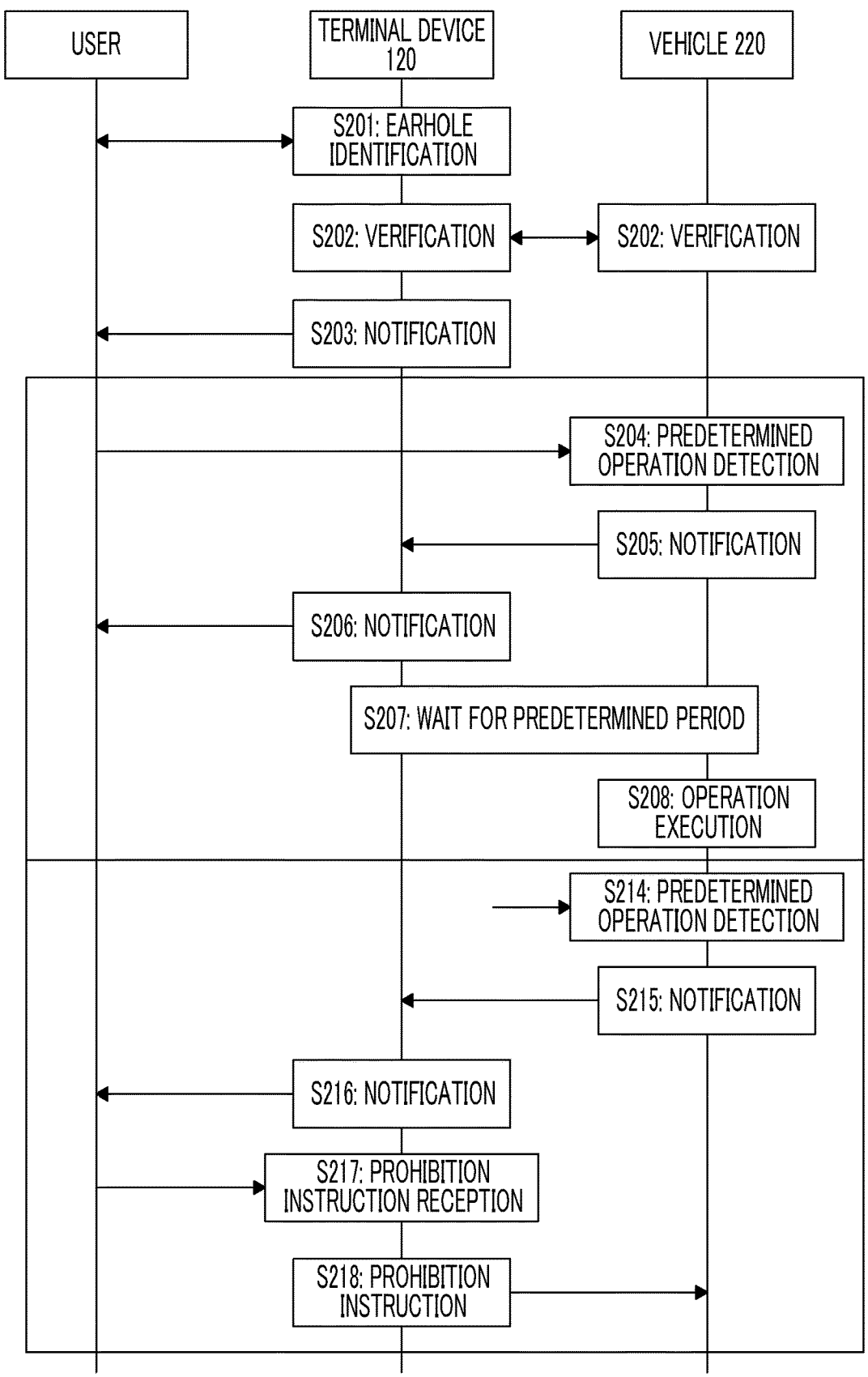
FIG. 5 is a sequence diagram illustrating a process of the vehicle control device according to the second embodiment.

FIG. 5 is a sequence diagram illustrating a process of the vehicle 220 and the terminal device 120. This process will be described with reference to FIG. 5.

Step S201: The terminal device 120 identifies the user through earhole identification, as in step S101 of the first embodiment.

Step S202: When the terminal device 120 enters a range in which communication with the vehicle 220 is possible, the terminal device 120 and the vehicle 220 perform wireless communication with each other and perform identification, as in step S102 of the first embodiment.

Step S203: The notification unit 115 of the terminal device 120 notifies the user that the verification in step S202 has been successful, as in step S103 of the first embodiment.

Step S204: A case in which, in this step to step S208, the user performs a predetermined manipulation such as touching a door handle with respect to the vehicle 220 with intention of causing the vehicle to perform an operation such as door unlocking will be described. In this step, when the user performs the predetermined manipulation, the manipulation detection unit 224 of the vehicle 220 detects the manipulation.

Step S205: The manipulation detection unit 224 of the vehicle 220 transmits a signal indicating that the predetermined manipulation has been performed via the second communication unit 213 and notifies the terminal device 120 of the fact. The operation instruction unit 114 of the terminal device 120 receives the signal via the first communication unit 117.

Step S206: The operation instruction unit 114 of the terminal device 120 causes the notification unit 115 to execute notification to the user according to the signal received in step S205. For example, when the predetermined manipulation is a touch manipulation with respect to the door handle, the notification unit 115 outputs a voice "unlock the door" or "Please perform a stop action when you want to stop unlocking" in addition to this from the speaker of the output unit 112. Through this step, when a manipulation not intended by the user is performed on the vehicle, the user can be reliably notified of this, but when the third party is nearby, this can be noticed and the notification is annoying to some users. Therefore, this step may be omitted. The notification may be executed through vibration. It may be able to be customized by user whether or not the notification is executed.

Step S207: The operation instruction unit 114 of the terminal device 120 waits for a predetermined prohibition instruction to be input from the user for a predetermined period from the notification in step S206. The prohibition instruction input will be described below. The operation controller 211 of the vehicle 220 also waits for the same period as in the operation instruction unit 114. The operation instruction unit 114 may cause the user identification unit 111 to execute the same earhole identification as in step S201 and perform identification of the user. It is desirable for the predetermined period to be, for example, equal to or greater than 0.5 seconds and equal to or smaller than one second.

Step S208: Since there is no prohibition instruction that is input from the user for a predetermined period in this step, the vehicle 220 executes the operation of the vehicle according to the predetermined manipulation detected in step S204. The sequence is then ended.

Step S214: In this step to step S218, a case where a third party other than the user is near the vehicle and performs a predetermined manipulation such as touching of a door handle with respect to the vehicle 220 with intention of causing the vehicle to perform an operation such as door unlocking without a legitimate right or a case where the user cancels the operation of the vehicle based on the above-described manipulation when the user or the third party accidentally or erroneously performs the above-described manipulation will be described. In this step, when the predetermined manipulation as described above is performed, the manipulation detection unit 224 of the vehicle 220 detects the manipulation, as in step S204.

Step S215: The manipulation detection unit 224 of the vehicle 220 transmits a signal indicating that the predetermined manipulation has been performed and notifies the terminal device 120 of the fact, as in step S205.

Step S216: The operation instruction unit 114 of the terminal device 120 causes the notification unit 115 to execute a notification to the user, as in Step S206.

Step S217: The operation instruction unit 114 of the terminal device 120 waits for a predetermined prohibition instruction to be input from the user for a predetermined period from the notification in step S216. The operation instruction unit 114 of the terminal device 120 may perform the identification of the user by causing the user identification unit 111 to execute the earhole identification, as in step S207. In this step, since the user does not intend to operate the vehicle, the operation instruction unit 114 performs a prohibition instruction. The prohibition instruction can be performed, for example, by uttering predetermined words such as "Do not unlock the door". The voice is input to the utterance sound microphone of the input unit 113 of the terminal device 120. A method of inputting the instruction is not limited thereto and, for example, when the input unit 113 includes a motion sensor, the user can perform the instruction input through an operation of shaking his or her head twice.

Step S218: The operation instruction unit 114 of the terminal device 120 transmits a signal indicating the received prohibition instruction to the vehicle 220 via the first communication unit 117. The operation controller 211 of the vehicle 220 receives a signal indicating an operation instruction from the operation instruction unit 114 of the terminal device 110 via the second communication unit 213 and cancels an operation such as door unlocking based on a manipulation such as the touch of the door handle received in step S214 according to the signal. The sequence is then ended.

Effects

According to the above process, the user can recognize that the terminal device 120 enters a range in which communication with the vehicle 220 is possible and that the operation can be executed by the manipulation with respect to the vehicle according to the present embodiment. Even when a predetermined manipulation is performed by a third party, the user can cancel the operation of the vehicle according to the manipulation of the third party. Accordingly, even when a communicable area is wider than in the related art, it is possible to further reduce a likelihood that a third party near the vehicle causing the vehicle to execute the operation.

Third Embodiment

Configuration

FIG. 6 is a functional block diagram of a vehicle control system 13 according to a third embodiment. The vehicle control system 13 includes a terminal device 130 and a vehicle 230. The terminal device 130 does not include the operation instruction unit 114 in the terminal device 110 according to the first embodiment, and further includes a first human body communication unit 137. The vehicle 230 further includes a second human body communication unit 235 in the vehicle 210 according to the first embodiment. Hereinafter, differences between the third embodiment and the first embodiment will be mainly described, and description of the same or corresponding features will be omitted or simplified.

Process

FIG. 7 is a sequence diagram illustrating a process of the vehicle 230 and the terminal device 130. This process will be described with reference to FIG. 7.

Step S301: The terminal device 130 identifies the user through earhole identification, as in step S101 of the first embodiment.

Step S302: When the terminal device 130 enters a range in which communication with the vehicle 220 is possible, the terminal device 130 and the vehicle 230 perform wireless communication with each other and perform verification, as in step S102 of the first embodiment.

Step S303: The notification unit 115 of the terminal device 130 notifies the user that the verification in step S302 has been successful, as in step S103 of the first embodiment.

Step S304: When the user performs a predetermined manipulation, the second human body communication unit 235 of the vehicle 230 detects the manipulation. The second human body communication unit 235 has an electrode provided at a position with which the user comes into contact according to various manipulations, such as a door handle, an engine startup switch, or a brake pedal.

Step S305: The first human body communication unit 137 of the terminal device 130 has an electrode that comes into contact with the ear of the user or the like in a state in which the user has the terminal device 130 mounted thereon (or, an electrode located very close to the ear or the like without coming into contact with the ear or the like). Therefore, when the user performs a predetermined manipulation in step S302, a path of human body communication in which a body of the user is used as a communication path is formed between the first human body communication unit 137 and the second human body communication unit 235. In this step, the terminal device 130 and the vehicle 230 perform verification through human body communication. The verification includes, for example, a notification of an identification result in steps S301 and S302 or a new verification process between the terminal device 130 and the vehicle 230 using human body communication. Earhole identification may be performed again in this step. When the identification as described above fails, subsequent processes are not executed and the sequence is ended.

Step S306: When the verification is successful in step S305, the operation controller 211 of the vehicle 230 executes an operation such as door unlocking based on the predetermined manipulation performed in step S302. The sequence is then ended.

Effects

According to the above process, the user can recognize that the vehicle 230 is nearby according to the terminal device 130 entering the range in which communication with the vehicle 230 is possible. Since the verification through human body communication with the vehicle can be performed according to a predetermined manipulation of the user having the terminal device 130 mounted thereon, it is possible to further reduce a likelihood of a third party near the vehicle causing the vehicle to execute an operation even when the communicable area is wider than in the related art.

Since the verification between the terminal device 130 and the vehicle 230 can be performed through the human body communication in step S304, step S302 may be omitted when the notification in step S303, that is, the notification of the fact that the vehicle is nearby is not needed. In this case, the wireless communication is not needed.

In each of the above-described embodiments, the door unlocking has been described as an example of the operation of the vehicle that is a control target, but the embodiment is not limited thereto, and various operations such as door locking, engine startup, opening of a trunk, and opening of a fuel filler port may be control targets for further improvement of convenience.

The terminal device may have a configuration in which, for example, all of the units are included in the ear mounting unit to be mounted on the ear of the user or may have a configuration in which at least the output unit is included in the ear mounting unit, the other units are included in a mobile terminal device such as a smartphone, and the ear mounting unit and the mobile terminal device may perform wireless or wired communication.

The embodiment can be regarded not only as a system including a terminal device and a vehicle, but also as a method that is executed by a single body of a terminal device or a single vehicle, or one or more computers including a processor, or a program thereof.

The present embodiment is useful for a vehicle control system that controls an operation of a vehicle or the like.

What is claimed is:

1. A vehicle comprising:
one or more processors programmed to:
perform a verification of a device based on information on the device, the device being configured to identify a user using biometric information;
in response to detecting a first operation to the vehicle after verifying the device, perform a notification corresponding to the first operation via the device to the user;
wait for a predetermined period from a timing of performing the notification, and then determine whether the one or more processors receives an instruction to prohibit a vehicle operation corresponding to the first operation from the device within the predetermined period;
in response to determining that the one or more processors receives the instruction, not execute the vehicle operation corresponding to the first operation; and
in response to not receiving, from the device, the instruction within the predetermined period from the timing of performing the notification, execute the vehicle operation corresponding to the first operation,
wherein the predetermined period is greater than or equal to 0.5 seconds and less than or equal to one second.

2. The vehicle according to claim 1, wherein the verification of the device is performed using a wireless communication between the vehicle and the device.

3. The vehicle according to claim 1, wherein the information on the device is identification information of the device.

4. The vehicle according to claim 1, wherein the first operation is touching a door handle of the vehicle.

5. The vehicle according to claim 1, wherein the instruction is received by predetermined words being input to the device.

6. The vehicle according to claim 1, wherein the instruction is received by a predetermined motion by the user being input to the device.

7. The vehicle according to claim 1, wherein the biometric information is information on characteristics of an acoustic reflection of an identification sound emitted into an ear canal of the user.

8. A method comprising:
   performing a verification of a device based on information on the device, the device being configured to identify a user using biometric information;
   in response to detecting a first operation to a vehicle after verifying the device, performing a notification corresponding to the first operation via the device to the user;
   waiting for a predetermined period from a timing of performing the notification, and then determining whether an instruction to prohibit a vehicle operation corresponding to the first operation from the device is received within the predetermined period;
   in response to determining that the instruction is received, not executing the vehicle operation corresponding to the first operation; and
   in response to not receiving, from the device, the instruction within the predetermined period from the timing of performing the notification, executing the vehicle operation corresponding to the first operation,
   wherein the predetermined period is greater than or equal to 0.5 seconds and less than or equal to one second.

9. A non-transitory computer readable medium storing thereon a program causing a computer to execute a process, the process comprising:
   performing a verification of a device based on information on the device, the device being configured to identify a user using biometric information;
   in response to detecting a first operation to a vehicle after verifying the device, performing a notification corresponding to the first operation via the device to the user;
   waiting for a predetermined period from a timing of performing the notification, and then determining whether an instruction to prohibit a vehicle operation corresponding to the first operation from the device is received within the predetermined period;
   in response to determining that the instruction is received, not executing the vehicle operation corresponding to the first operation; and
   in response to not receiving, from the device, the instruction within the predetermined period from the timing of performing the notification, executing the vehicle operation corresponding to the first operation,
   wherein the predetermined period is greater than or equal to 0.5 seconds and less than or equal to one second.

10. A system comprising:
    the vehicle according to claim 1; and
    the device.

11. The system according to claim 10, wherein the device is configured to output a sound corresponding to the first operation in response to receiving the notification.

12. The system according to claim 10, wherein the device is configured to vibrate in response to receiving the notification.

13. The system according to claim 10, wherein the device is configured to:
    receive an input using predetermined words from the user; and
    transmit, in response to receiving the input using the predetermined words, the instruction to the vehicle.

14. The system according to claim 10, wherein
    the device includes a motion sensor configured to detect a predetermined motion of the user, and
    the device is configured to, in response to detecting the predetermined motion by the motion sensor, transmit the instruction to the vehicle.

* * * * *